US012732772B2

(12) United States Patent
Jones et al.

(10) Patent No.: US 12,732,772 B2
(45) Date of Patent: Sep. 8, 2026

(54) METHOD FOR DECORRELATING A SET OF SIMULATED AUDIO SIGNALS

(71) Applicants: Sony Interactive Entertainment Europe Limited, London (GB); Sony Interactive Entertainment LLC, San Mateo, CA (US)

(72) Inventors: Michael Lee Jones, London (GB); Christopher Buchanan, London (GB); Danjeli Schembri, London (GB); Louis-Xavier Buffoni, San Mateo, CA (US); Allen Lee, San Mateo, CA (US)

(73) Assignees: Sony Interactive Entertainment Europe Limited and Sony, London (GB); Interactive Entertainment LLC, San Mateo, CA (US)

( * ) Notice: Subject to any disclaimer, the term of this patent is extended or adjusted under 35 U.S.C. 154(b) by 154 days.

(21) Appl. No.: 18/665,771

(22) Filed: May 16, 2024

(65) Prior Publication Data

US 2024/0388868 A1 Nov. 21, 2024

(30) Foreign Application Priority Data

May 17, 2023 (GB) ..................................... 2307394

(51) Int. Cl.
*H04S 7/00* (2006.01)
*H04S 3/00* (2006.01)

(52) U.S. Cl.
CPC .............. *H04S 7/307* (2013.01); *H04S 3/008* (2013.01); *H04S 2400/01* (2013.01); *H04S 2400/09* (2013.01)

(58) Field of Classification Search
CPC ......... G10L 19/008; H04S 5/00; H04S 7/307; H04S 3/008; H04S 7/30; H04S 2400/01; H04S 2400/09
See application file for complete search history.

(56) References Cited

U.S. PATENT DOCUMENTS 6,498,857 B1 * 12/2002 Sibbald ..................... H04S 7/30 381/1
9,807,534 B2 10/2017 Schneider et al.
9,830,916 B2 11/2017 Melkote et al.
(Continued)

OTHER PUBLICATIONS

Reich et al, Development and Analysis of Decorrelation filter for binaural rendering of Audio Definition Model Content (Year: 2021).*
(Continued)

*Primary Examiner* — Carolyn R Edwards
*Assistant Examiner* — Kuassi A Ganmavo
(74) *Attorney, Agent, or Firm* — Fish & Richardson P.C.

(57) ABSTRACT

A computer-implemented method for decorrelating a set of simulated audio signals in a virtual environment is disclosed. The method comprises the steps of: obtaining a first set of decorrelation filters; evaluating the first set of decorrelation filters to determine a similarity metric representing the similarity between the first set of decorrelation filters; if the similarity metric is above a predetermined threshold, regenerating the set of decorrelation filters so as to reduce the similarity metric; and applying the regenerated set of decorrelation filters to the simulated audio signals.

20 Claims, 3 Drawing Sheets

(56) References Cited

U.S. PATENT DOCUMENTS

| | | | | |
|---|---|---|---|---|
| 2010/0040243 | A1* | 2/2010 | Johnston | H04S 7/30<br>381/97 |
| 2011/0211702 | A1* | 9/2011 | Mundt | H04S 7/30<br>381/17 |
| 2012/0029916 | A1* | 2/2012 | Tsujikawa | G10L 21/0272<br>704/200 |
| 2013/0173274 | A1* | 7/2013 | Kuntz | G10L 19/0017<br>704/500 |
| 2014/0185811 | A1* | 7/2014 | Stein | H04S 7/307<br>381/98 |
| 2016/0005406 | A1* | 1/2016 | Yen | H04S 3/008<br>381/23 |
| 2016/0212561 | A1* | 7/2016 | Adami | G10L 19/008 |
| 2017/0026740 | A1* | 1/2017 | Kirsch | H04M 3/568 |
| 2020/0213800 | A1* | 7/2020 | Jot | H04S 7/302 |
| 2021/0352425 | A1* | 11/2021 | Pang | H04S 3/004 |
| 2022/0028400 | A1* | 1/2022 | McGrath | H04S 3/008 |

OTHER PUBLICATIONS

Combined Search and Examination Report under Sections 17 and 18(3) for Application No. GB2307394.3 dated Nov. 21, 23. 5 pgs.

* cited by examiner

| Filter | Frequency Selecting Variable (Hz) | Phase Delay Variable (rad) |
|---|---|---|
| F1 | 500-1000 | 3π/4 |
| F2 | 9000-15000 | π/6 |
| F3 | 80-90 | π/4 |
| F4 | 10000-11000 | π/3 |
| F5 | 600-700 | π/3 |

*FIG. 3*

METHOD FOR DECORRELATING A SET OF SIMULATED AUDIO SIGNALS

CROSS-REFERENCE TO RELATED APPLICATION

The present application claims priority from United Kingdom Patent Application No. GB2307394.3, filed May 17, 2023, the disclosure of which is hereby incorporated herein by reference.

FIELD OF THE INVENTION

Disclosed herein is a method for decorrelating a set of simulated audio signals. More specifically, a method for decorrelating a set of simulated audio signals in a virtual environment is disclosed.

BACKGROUND

Modern virtual environments, such as video game environments, are programmed such that physical phenomena that occur in reality are closely replicated in simulations. For example, video game environments are programmed to mirror the acoustic behaviours of real environments, such that sounds propagate in a manner akin to that in reality.

When producing simulated audio signals representing sounds in a virtual environment, such as a video game environment, undesired phasing artefacts can be present in the audio output. This is due to interference between multiple copies of the simulated audio signals as they reflect off simulated surfaces in the virtual environment. As a virtual avatar moves around in the video game environment, for example, the undesired phasing artefacts can become more pronounced.

Common approaches to minimise the phasing artefacts involve randomly generating decorrelation filters and applying these to the multiple copies of the simulated audio signals to produce differences between each of the multiple copies. An issue with this approach is that due to the fact that the filters are randomly generated the filters can often be similar to one another and therefore do not adequately address the problem of phasing artefacts.

It is an object of the invention to make progress in overcoming these issues.

SUMMARY

In an aspect of the present invention there is provided a computer-implemented method for decorrelating a set of simulated audio signals in a virtual environment, the method comprising: obtaining a first set of decorrelation filters; evaluating the first set of decorrelation filters to determine a similarity metric representing the similarity between the first set of decorrelation filters; if the similarity metric is above a predetermined threshold, regenerating the set of decorrelation filters so as to reduce the similarity metric; and applying the regenerated set of decorrelation filters to the simulated audio signals.

It has been found that applying decorrelation filters that are similar to one another to simulated audio signals is often ineffective in minimising phasing artefacts present in the audio output from the virtual environment. In this way, the decorrelation filters that are applied to the simulated audio signals are more dissimilar to one another, thereby improving the minimisation of the phasing artefacts in the audio output of the virtual environment.

Preferably, determining the similarity metric comprises calculating the cross-correlation between each decorrelation filter within the set of decorrelation filters. In this way, it can be accurately determined how varied the decorrelation filters are in the set of filters. By calculating the cross-correlation between the filters, it can be determined how similar the properties of the filters are to one another and how randomly spread the properties of each of the filters are from each other in the set.

Preferably, the set of decorrelation filters are iteratively regenerated until the similarity metric is below the predetermined threshold. In this way, the decorrelation filters are only applied to the simulated audio signals if the decorrelation filters are acceptably dissimilar to one another, thereby further minimising the phasing artefacts.

Preferably, the first set of decorrelation filters alter the phases of the audio signals in the set of simulated audio signals. In this way, the degree of interference between the simulated audio signals can be reduced, thereby minimising the phasing artefacts.

Preferably, the first set of decorrelation filters maintains the amplitudes of the audio signals in the set of simulated audio signals. In this way, the timbre of the simulated audio signals remains unaffected by the application of the decorrelation filters.

Preferably, the first set of decorrelation filters comprises a set of all-pass filters. In this way, the amplitudes of the simulated audio signals remain unchanged when the decorrelation filters are applied, but the phases of various frequencies within of the simulated audio signals are changed.

Preferably, the first set of decorrelation filters comprises a frequency selecting variable that selects the frequencies in the set of simulated audio signals to be filtered and a phase delay variable that determines the maximum phase that the selected frequencies are to be delayed. In this way, the decorrelation filters can vary in nature to specifically target frequencies in the simulated audio signals that are producing phasing artefacts. These variables can also be individually evaluated in determining the similarity metric. In certain embodiments, the amount by which a certain frequency should be phase shifted may be generated randomly for each frequency within a certain range of frequencies.

Preferably, the first set of decorrelation filters is obtained by randomly generating the first set of decorrelation filters. More preferably, randomly generating the first set of decorrelation filters comprises randomly generating the frequency selecting variable and the phase delay variable. In this way, a variety of decorrelation filters can be produced with quantifiable properties for the similarity evaluation.

In embodiments, the set of simulated audio signals may comprise multiple copies of an audio signal, the multiple copies may constructively and/or destructively interfere with one another. Furthermore, the computer-implemented method may comprise the initial step of: generating the set of audio signals according to acoustic parameters of the virtual environment.

BRIEF DESCRIPTION OF DRAWINGS

Embodiments of the invention are now described, by way of example, by reference to the drawings, in which:

FIG. 3 is a table comprising a randomly generated set of decorrelation filters in an embodiment of the invention.

DETAILED DESCRIPTION

Figure 1:
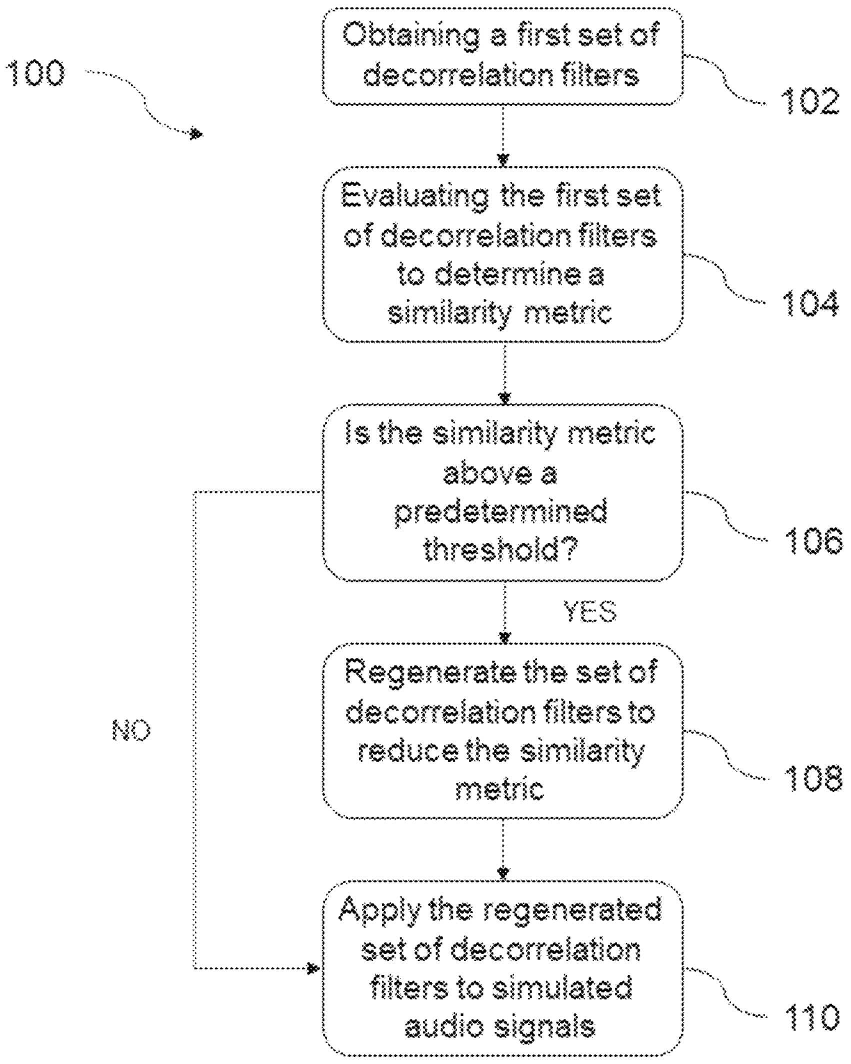
FIG. 1 is a flow diagram of a computer-implemented method in an embodiment of the invention.

FIG. 1 is a flow diagram of a computer-implemented method 100 for decorrelating a set of simulated audio signals in a virtual environment in an embodiment of the invention. The method 100 comprises the steps 102, 104, 106, 108 and 110.

Step 102 comprises obtaining a set of decorrelation filters. Step 104 comprises evaluating the obtained set of decorrelation filters to determine a similarity metric. The similarity metric indicates the similarity between each of the decorrelation filers in the obtained set of decorrelation filters. Step 106 comprises determining whether the similarity metric is above a predetermined threshold or not. If the similarity metric is above the predetermined threshold, the decorrelation filters in the set are deemed to be too similar to one another and are not acceptable for application to the set of simulated audio signals. The set must therefore be regenerated at step 108 so as to reduce the similarity metric. The regenerated set of decorrelation filters can then be applied to the set of simulated audio signals at step 110 to decorrelate the set of simulated audio signals.

If the similarity metric is determined to be below the predetermined threshold at step 106, the decorrelation filters in the set are deemed to be dissimilar enough to one another and are acceptable for application to the set of simulated audio signals at step 110 to decorrelate the set of simulated audio signals. In this scenario, it is not necessary to regenerate the set of decorrelation filters at step 108.

Figure 2:
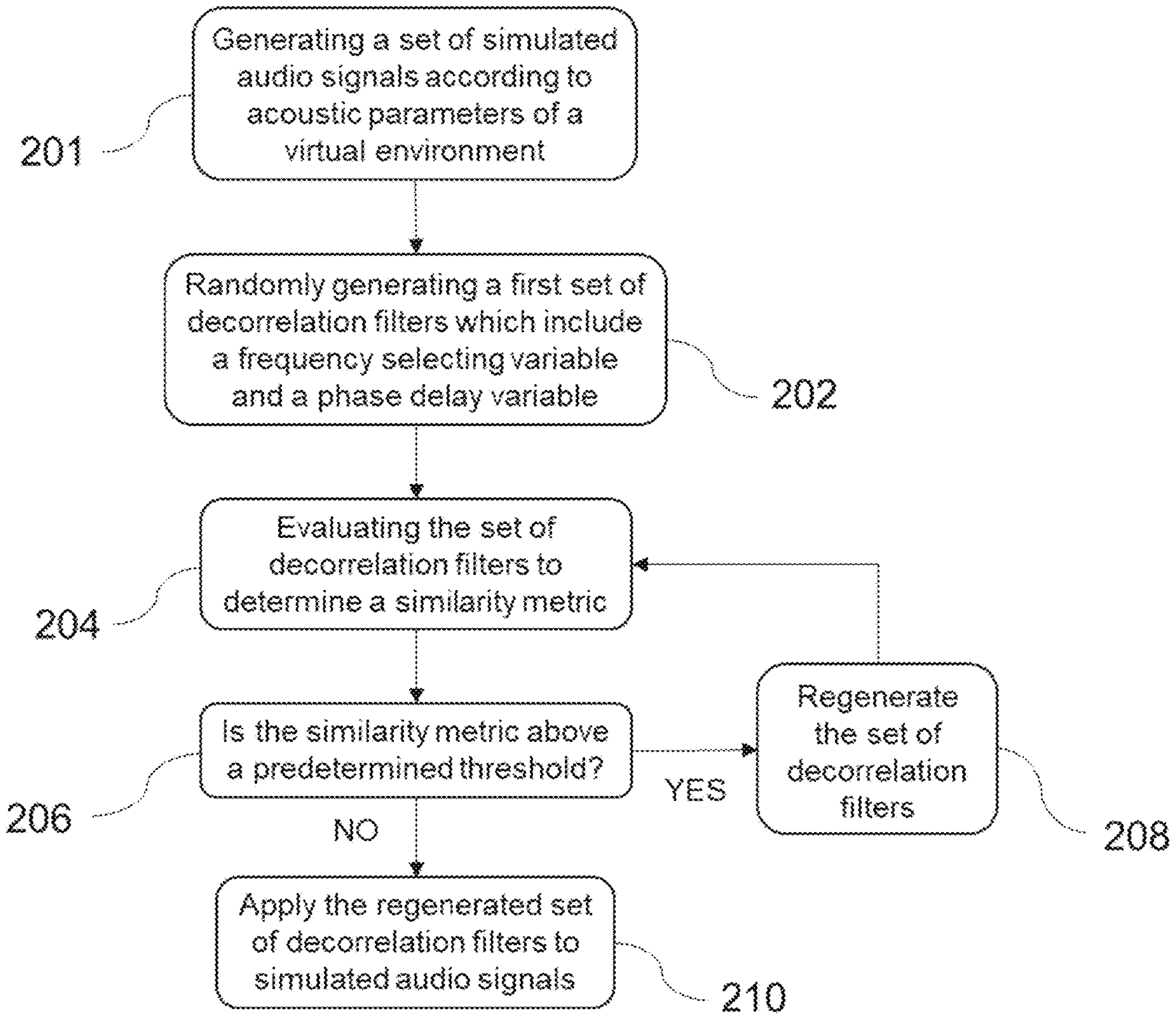
FIG. 2 is a flow diagram of a computer-implemented method in another embodiment of the invention.

FIG. 2 is a flow diagram of a computer-implemented method 200 for decorrelating a set of simulated audio signals in a virtual environment in another embodiment of the invention. The method 200 comprises the steps 201, 202, 204, 206, 208 and 210, however further steps may be additionally included at various stages in the method.

Step 201 comprises generating a set of simulated audio signals according to acoustic parameters of a virtual environment. Step 202 comprises randomly generating a set of decorrelation filters which each include a frequency selecting variable and a phase delay variable. The set of decorrelation filters is evaluated to determine a similarity metric at step 204. The similarity metric indicates the similarity between each of the decorrelation filters, including their frequency selecting variables and phase delay variables, in the randomly generated set of decorrelation filters. At step 206 it is determined whether the similarity metric is above or below a predetermined threshold. If the similarity metric is determined to be below the predetermined threshold, the randomly generated set of decorrelation filters are deemed to be dissimilar enough to one another and are acceptable for application to the generated set of simulated audio signals at step 210 to decorrelate the set of simulated audio signals thereby reducing phasing artefacts in the audio output of the virtual environment.

If the similarity metric is determined to be above the predetermined threshold, the randomly generated decorrelation filters are deemed to be too similar to one another and are therefore not acceptable for application to the set of simulated audio signals. If this is found to be the case, a new set of decorrelation filters is randomly generated at step 208. The method then returns to step 204, where the regenerated decorrelation filters are evaluated to determine a similarity metric associated with the regenerated decorrelation filters. The method then progresses to step 206, where it is determined whether the similarity metric associated with the regenerated decorrelation filters is above or below the predetermined threshold. This regeneration process is iterated over until the regenerated decorrelation filters are determined to have a similarity metric that is below the predetermined threshold. The regenerated set of decorrelation filters are then acceptable for application to the generated set of simulated audio signals at step 210 to decorrelate the set of simulated audio signals thereby reducing phasing artefacts in the audio output of the virtual environment.

In this embodiment, step 201 comprises generating a set of simulated audio signals according to acoustic parameters of a virtual environment. The set of simulated audio signals which represent sounds comprises multiple copies of the same audio signal. This can occur in a video game environment, for example, when an audio signal reflects off multiple simulated surfaces in the video game environment producing multiple delayed copies of the original audio signal. The multiple copies of the original simulated audio signal then interfere with each other, either constructively and/or destructively, producing phasing artefacts in the audio output of the video game environment.

Step 202 comprises randomly generating a set of decorrelation filters. In this embodiment, each decorrelation filter in the randomly generated set includes a frequency selecting variable and a phase delay variable. When the set of decorrelation filters is randomly generated, the frequency selecting variable and the phase delay variable are each randomly generated for each decorrelation filter in the set. The frequency selecting variable indicates the frequency or the frequencies for which the decorrelation filter is to apply. The phase delay variable determines to what degree the filter is to induce a frequency delay on the frequency or the frequencies indicated by the frequency selecting variable.

For example, as shown in FIG. 3, a first randomly generated decorrelation filter F1 in the set could have a frequency selecting variable of 500 Hz to 1000 Hz and a phase delay variable of $3\pi/4$. If applied to the simulated audio signals, this filter would introduce a random phase shift between 0 and $3\pi/4$ to randomly selected frequencies within the 500 Hz to 1000 Hz range.

A second randomly generated decorrelation filter F2 in the set could have a frequency selecting variable of 9000 Hz to 15000 Hz and a phase delay variable of $\pi/6$. If applied to the simulated audio signals, this filter would introduce a random phase shift between 0 and $\pi/6$ to randomly selected frequencies within the 9000 Hz to 15000 Hz range.

In the embodiment of FIG. 2, the randomly generated set of decorrelation filters comprises a plurality of randomly generated all-pass filters that each differently alter the phases of different frequencies in the set of simulated audio signals, without altering the amplitudes of the simulated audio signals.

In alternative embodiments, the randomly generated set of decorrelation filters may comprise other types of filters that are randomly generated. For example, the randomly generated set of decorrelation filters may comprise high pass, low pass and/or band pass filters that are each randomly generated. Alternatively, any all-pass filter generation method may be used to provide the randomly generated set of decorrelation filters.

At step 204, the randomly generated set of decorrelation filters are evaluated to determine a similarity metric. The similarity metric indicates the similarity between each of the decorrelation filters, specifically the similarities between the frequency selecting variables and the phase delay variables of each of the decorrelation filters, in the randomly generated set of decorrelation filters. In this embodiment, the similarity metric is calculated by measuring the cross-correlation between the frequency selecting variables and the phase delay variables of each of the decorrelation filters in the randomly generated set.

For example, with reference to FIG. 3, the correlation between the phase delay variables of each of the filters F1-F5 could be calculated along with the cross-correlation between the frequency selecting variables of each of the filters F1-F5, or vice versa, to determine an overall similarity metric. In alternative embodiments, the similarity metric may be calculated using only a cross-correlation metric.

At step 206, it is determined whether the similarity metric is above or below a predetermined threshold. In this embodiment, the predetermined threshold is a fixed value. If the calculated similarity metric is of a greater value than that of the predetermined threshold, then the randomly generated decorrelation filters are deemed to be too similar to one another to be applied to the simulated audio signals. If the calculated similarity metric is of a lesser value than that of the predetermined threshold, then the randomly generated decorrelation filters are deemed to be dissimilar enough from one another and are therefore suitable to be applied to the simulated audio signals. In alternative embodiments, the predetermined threshold may not be a fixed value. For example, the predetermined threshold may be programmed to change over time.

If the calculated similarity metric is of a greater value than that of the predetermined threshold, and therefore that the randomly generated decorrelation filters are too similar to one another to be applied to the simulated audio signals, then a set or subset of decorrelation filters is regenerated at step 208. The regenerated set of decorrelation filters is generated in the same way as that of the randomly generated set of decorrelation filters as described in step 202.

The regenerated set of decorrelation filters is analysed according to steps 204 and 206 described above. The generated sets of decorrelation filters are iteratively regenerated until a regenerated set of decorrelation filters has an associated similarity metric that is below the predetermined threshold, as shown in FIG. 2.

At step 210, once it has been determined that the similarity metric of the set of decorrelation filters is below the predetermined threshold and that each of the filters are suitably dissimilar from one another, the filters are applied to the simulated audio signals to minimise the phasing artefacts in the video game environment. The decorrelation filters introduce a phase delay for select frequencies in the simulated audio signals, thereby reducing the effects of interference between multiple copies of the simulated audio signals. The decorrelation filters also pass the select frequencies equally in gain to prevent the multiple copies of the simulated audio signals from being overly distorted.

In alternative embodiments, the methods discussed herein may further comprise the step of applying optimisation algorithms or machine learning techniques to generate a set of decorrelation filters as opposed to randomly generating a set of decorrelation filters. More specifically, machine learning techniques may be applied to generate a set of all-pass filters. The decorrelation capabilities of each all-pass filter in the set and the dissimilarities between each all-pass filter in the set are maximised in a single optimisation process.

The invention claimed is:

1. A computer-implemented method comprising:

generating a set of decorrelation filters based at least on one or more acoustic parameters of a virtual environment;

for each pair of decorrelation filters in the set, generating a similarity metric that represents a similarity of the pair of decorrelation filters;

for each pair of the decorrelation filters in the set, determining that the similarity metric for the pair of the decorrelation filters satisfies a predetermined threshold; and in response to determining, for each pair of the decorrelation filters in the set, that the similarity metric for each pair satisfies the predetermined threshold, applying the set of decorrelation filters to reduce phasing artifacts in simulated audio signals produced from the one or more acoustic parameters.

2. The computer-implemented method of claim 1, wherein generating a set of decorrelation filters based at least on one or more acoustic parameters of a virtual environment comprises:

selecting frequencies from the one or more acoustic parameters of the virtual environments that produce the phasing artifacts; and generating the set of decorrelation filters using the selected frequencies from the one or more acoustic parameters of the virtual environments that produce the phasing artifacts.

3. The computer-implemented method of claim 1, wherein the set of decorrelation filters comprises at least one of high pass, low pass, or band pass filters.

4. The computer-implemented method of claim 1, wherein generating a set of decorrelation filters based at least on one or more acoustic parameters of a virtual environment comprises selecting, for each decorrelation filter of the set of decorrelation filters, a frequency variable for filtering and a phase delay variable for a maximum phase delay to apply.

5. The computer-implemented method of claim 4, wherein generating a similarity metric that represents a similarity of the pair of decorrelation filters comprises generating, for each pair of the decorrelation filters in the set, a cross correlation output between the frequency variable and the phase delay variable.

6. The computer-implemented method of claim 1, wherein determining that the similarity metric for the pair of the decorrelation filters satisfies a predetermined threshold comprises determining that the similarity metric for the pair of the decorrelation filters is less than the predetermined threshold.

7. The computer-implemented method of claim 1, further comprising:

determining, for at least one pair of the decorrelation filters in the set, that the similarity metric for the pair of the decorrelation filters does not satisfy the predetermined threshold; and in response to determining, for at least one pair of the decorrelation filters in the set, that the similarity metric does not satisfy the predetermined threshold, designating the at least one pair of the decorrelation filters in the set cannot be applied to the simulated audio signals.

8. The computer-implemented method of claim 7, further comprising iteratively regenerating the decorrelation filters in the set until the similarity metric for the corresponding pair of decorrelation filters satisfy the predetermined threshold.

9. The computer-implemented method of claim 1, further comprising generating the simulated audio signals using the one or more acoustic parameters of the virtual environment, wherein the simulated audio signals represents multiple copies of an audio signal in the virtual environment.

10. A system comprising:

one or more computers and one or more storage devices on which are stored instructions that are operable, when executed by the one or more computers, to cause the one or more computers to perform operations comprising:

generating a set of decorrelation filters based at least on one or more acoustic parameters of a virtual environment;

for each pair of decorrelation filters in the set, generating a similarity metric that represents a similarity of the pair of decorrelation filters;

for each pair of the decorrelation filters in the set, determining that the similarity metric for the pair of the decorrelation filters satisfies a predetermined threshold; and in response to determining, for each pair of the decorrelation filters in the set, that the similarity metric for each pair satisfies the predetermined threshold, applying the set of decorrelation filters to reduce phasing artifacts in simulated audio signals produced from the one or more acoustic parameters.

11. The system of claim 10, wherein generating a set of decorrelation filters based at least on one or more acoustic parameters of a virtual environment comprises:

selecting frequencies from the one or more acoustic parameters of the virtual environments that produce the phasing artifacts; and generating the set of decorrelation filters using the selected frequencies from the one or more acoustic parameters of the virtual environments that produce the phasing artifacts.

12. The system of claim 10, wherein the set of decorrelation filters comprises at least one of high pass, low pass, or band pass filters.

13. The system of claim 10, wherein generating a set of decorrelation filters based at least on one or more acoustic parameters of a virtual environment comprises selecting, for each decorrelation filter of the set of decorrelation filters, a frequency variable for filtering and a phase delay variable for a maximum phase delay to apply.

14. The system of claim 13, wherein generating a similarity metric that represents a similarity of the pair of decorrelation filters comprises generating, for each pair of the decorrelation filters in the set, a cross correlation output between the frequency variable and the phase delay variable.

15. The system of claim 10, wherein determining that the similarity metric for the pair of the decorrelation filters satisfies a predetermined threshold comprises determining that the similarity metric for the pair of the decorrelation filters is less than the predetermined threshold.

16. The system of claim 10, further comprising:

determining, for at least one pair of the decorrelation filters in the set, that the similarity metric for the pair of the decorrelation filters does not satisfy the predetermined threshold; and in response to determining, for at least one pair of the decorrelation filters in the set, that the similarity metric does not satisfy the predetermined threshold, designating the at least one pair of the decorrelation filters in the set cannot be applied to the simulated audio signals.

17. The system of claim 16, further comprising iteratively regenerating the decorrelation filters in the set until the similarity metric for the corresponding pair of decorrelation filters satisfy the predetermined threshold.

18. The system of claim 10, further comprising generating the simulated audio signals using the one or more acoustic parameters of the virtual environment, wherein the simulated audio signals represents multiple copies of an audio signal in the virtual environment.

19. One or more non-transitory computer storage media encoded with computer program instructions that when executed by one or more computers cause the one or more computers to perform operations comprising:

generating a set of decorrelation filters based at least on one or more acoustic parameters of a virtual environment;

for each pair of decorrelation filters in the set, generating a similarity metric that represents a similarity of the pair of decorrelation filters;

for each pair of the decorrelation filters in the set, determining that the similarity metric for the pair of the decorrelation filters satisfies a predetermined threshold; and in response to determining, for each pair of the decorrelation filters in the set, that the similarity metric for each pair satisfies the predetermined threshold, applying the set of decorrelation filters to reduce phasing artifacts in simulated audio signals produced from the one or more acoustic parameters.

20. The one or more non-transitory computer storage media of claim 19, wherein generating a set of decorrelation filters based at least on one or more acoustic parameters of a virtual environment comprises:

selecting frequencies from the one or more acoustic parameters of the virtual environments that produce the phasing artifacts; and generating the set of decorrelation filters using the selected frequencies from the one or more acoustic parameters of the virtual environments that produce the phasing artifacts.

* * * * *